United States Patent
Bauer et al.

(10) Patent No.: US 10,145,722 B2
(45) Date of Patent: Dec. 4, 2018

(54) METHOD FOR MANUFACTURING A TANK WITH A CALIBRATED SENSOR

(71) Applicant: EMITEC GESELLSCHAFT FÜR EMISSIONSTECHNOLOGIE MBH, Lohmar (DE)

(72) Inventors: Peter Bauer, Immenreuth (DE); Jan Hodgson, Troisdorf (DE); Denis Mesmer, Bouzonville (FR)

(73) Assignee: Continental Automotive GmbH, Hannover (DE)

( * ) Notice: Subject to any disclaimer, the term of this patent is extended or adjusted under 35 U.S.C. 154(b) by 129 days.

(21) Appl. No.: 14/909,217

(22) PCT Filed: Jul. 28, 2014

(86) PCT No.: PCT/EP2014/066208
§ 371 (c)(1),
(2) Date: Feb. 1, 2016

(87) PCT Pub. No.: WO2015/014810
PCT Pub. Date: Feb. 5, 2015

(65) Prior Publication Data
US 2016/0216149 A1    Jul. 28, 2016

(30) Foreign Application Priority Data
Jul. 30, 2013  (DE) .................. 10 2013 108 158

(51) Int. Cl.
| F01N 3/20 | (2006.01) |
| G01F 23/296 | (2006.01) |
| G01F 25/00 | (2006.01) |

(52) U.S. Cl.
CPC ....... *G01F 25/0061* (2013.01); *F01N 3/2066* (2013.01); *G01F 23/296* (2013.01); *G01F 23/2962* (2013.01); *G01F 25/0084* (2013.01)

(58) Field of Classification Search
CPC .. F01N 3/2066; G01F 23/296; G01F 23/2962; G01F 25/0061; G01F 25/0084
See application file for complete search history.

(56) References Cited

U.S. PATENT DOCUMENTS

| 7,305,875 B1 | 12/2007 | Pindus et al. |
| 7,711,509 B2 * | 5/2010 | Woodard .............. G01F 23/266 702/100 |
| 2008/0295569 A1 * | 12/2008 | Lundstrom ............. G01F 23/32 73/1.73 |

(Continued)

FOREIGN PATENT DOCUMENTS

| DE | 102012205640 A1 | 7/2013 |
| EP | 1674838 A2 * | 6/2006 ............. G01F 23/32 |

(Continued)

*Primary Examiner* — Brandon Lee
(74) *Attorney, Agent, or Firm* — Laurence A. Greenberg; Werner H. Stemer; Ralph E. Locher

(57) ABSTRACT

A method for manufacturing a tank for a motor vehicle for storing a liquid additive with a calibrated sensor for determining at least one parameter of the liquid additive in the tank. In a step a) the sensor is installed in the tank. In a step b) the tank is at least partially filled with a predefined quantity of a test liquid. In a step c) a signal of the sensor is determined, and in a step d) the sensor is calibrated with the signal.

6 Claims, 2 Drawing Sheets

(56) References Cited

U.S. PATENT DOCUMENTS

| | | | |
|---|---|---|---|
| 2009/0188923 A1 | 7/2009 | Versaw, Jr. et al. | |
| 2009/0230136 A1* | 9/2009 | Dougnier | F01N 3/2066 |
| | | | 220/592.01 |
| 2009/0260414 A1* | 10/2009 | Loodberg | B63B 11/04 |
| | | | 73/1.73 |
| 2011/0301883 A1 | 12/2011 | Murphy | |
| 2013/0074590 A1 | 3/2013 | Bertow et al. | |
| 2013/0160433 A1* | 6/2013 | Schepers | G01F 23/2963 |
| | | | 60/295 |
| 2014/0298885 A1 | 10/2014 | Criel et al. | |
| 2014/0345377 A1 | 11/2014 | Jäger et al. | |
| 2015/0354429 A1* | 12/2015 | Thompson | F01N 3/208 |
| | | | 137/4 |

FOREIGN PATENT DOCUMENTS

| | | | | |
|---|---|---|---|---|
| EP | 2589507 A1 | 5/2013 | | |
| FR | 2911681 A1 | 7/2008 | | |
| WO | 02084231 A1 | 10/2002 | | |
| WO | WO 2012022721 A1 * | 2/2012 | ......... | G01F 23/2962 |
| WO | 2012144945 A1 | 10/2012 | | |

\* cited by examiner

METHOD FOR MANUFACTURING A TANK WITH A CALIBRATED SENSOR

BACKGROUND OF THE INVENTION

Field of the Invention

The invention relates to a method for manufacturing a tank with a calibrated sensor which can be used, for example, in a motor vehicle for storing a liquid additive (such as, in particular, a urea-water solution) for purifying exhaust gas.

In order to purify exhaust gases of internal combustion engines, exhaust gas treatment devices are known in which the SCR (=Selective Catalytic Reduction) method is carried out, in which nitrogen oxide compounds in the exhaust gas are reduced using a reducing agent. In particular ammonia is used as the reducing agent. Ammonia is often not stored directly in motor vehicles but instead in the form of a precursor solution which can be converted into ammonia internally with respect to the exhaust gas (in the exhaust gas treatment device) and/or externally with respect to the exhaust gas (in a reactor which is provided externally with respect to the exhaust gas for this purpose). A reducing agent precursor solution which is particularly frequently used as a liquid additive for purifying exhaust gas is a urea-water solution which can be obtained with urea a content of 32.5% with the trade name AdBlue®.

The tank for liquid additive should have a filling level sensor for monitoring the available quantity of liquid additive. Such a filling level sensor should be as cost-effective as possible and at the same time as reliable and precise as possible. When the filling level in the tank is measured, it is particularly problematic that the (current or actual) chemical properties of the liquid additive are not known precisely and, under certain circumstances, can also vary. A filling level sensor should therefore be able to measure the filling level in a tank precisely even under these conditions.

Furthermore, it may be problematic that the liquid (in particular aqueous) additive can freeze at low temperatures. When freezing occurs, the physical properties of the liquid additive change and in particular there is an increase in volume. This can lead to falsification of the filling level measurement. The urea-water solution specified above freezes, for example, at approximately −11° C. Such low temperatures can occur in motor vehicles in the winter, in particular during long deactivated periods of the motor vehicle. Therefore, when a motor vehicle is operating until now falsification of the filling level measurement as a result of freezing liquid additive has had to be generally allowed for.

Furthermore, in tanks for liquid additives it is problematic that they are usually of very complex shape in order to be adapted to the installation space which is available in a motor vehicle. Such tanks therefore frequently have a very indented shape. This makes the measurement of the filling level significantly more difficult in such tanks.

Furthermore, it is generally advantageous if information about chemical and/or physical properties of the liquid additive in a tank can be acquired with sensors. Such information is advantageous, for example, for detecting the quantity of liquid additive which is fed to an exhaust gas treatment device.

BRIEF SUMMARY OF THE INVENTION

Taking the above as a basis, the object of the present invention is to solve or at least alleviate the described technical problems. The intention is in particular to present a particularly advantageous method for manufacturing a tank with a calibrated sensor in which the calibration of the sensor can be carried out particularly precisely and particularly easily.

These objects are achieved with a method as claimed. Further advantageous refinements of the method are specified in the dependent claims. The features disclosed individually in the claims can be combined with one another in any desired technically appropriate way and can be supplemented by explanatory contents from the description, in particular also the description of the figures.

The invention relates to a method for manufacturing a tank for a motor vehicle for storing a liquid additive with at least one calibrated sensor for determining at least one parameter of the liquid additive in the tank, having the following steps:

a) installing the sensor in the tank,
b) at least partially filling the tank with a quantity of a test liquid,
c) determining a signal of the sensor, and
d) calibrating the sensor with the signal.

The method can be applied, in particular, if the at least one parameter is a filling level of the liquid additive in the tank and the at least one sensor is a filling level sensor. Further sensor types for which the method can be applied are also explained below.

The sensor is preferably arranged in the vicinity of the tank bottom or on the tank bottom. If the sensor is a filling level sensor, it is preferably configured to measure the filling level in the tank over the entire height of the tank. The liquid additive can be used as a test liquid. However, it is also possible for an equivalent liquid to be used as the test liquid, which generates, at the filling level sensor, a filling level signal which corresponds to the signal which would be brought about by a corresponding quantity of liquid additive.

The sensor is preferably arranged on a feed module which is inserted into the tank in step a). Such a feed module can be arranged, for example, in the bottom region of the tank in order to extract liquid additive from the tank. Such a feed module usually has an intake point at which liquid additive is taken in from the tank, and a supply port at which the feed module supplies the liquid additive (outside the tank). The intake point and the supply port are preferably connected to one another by a feed duct. A pump which feeds the liquid additive from the intake point to the supply port along the feed duct is preferably arranged on or in the feed duct inside the feed module. The feed module can also contain further components. Such components are, for example, a temperature sensor, a pressure sensor, a heater for heating the liquid additive and/or a valve for controlling the feeding. Furthermore, electronic components can also be arranged in the feed module. For example, the feed module can contain evaluation electronics with which the signal of the sensor can be evaluated.

During the partial filling of the tank in step b), a preferably predefined quantity of test liquid is filled into the tank, wherein a predefined quantity means in particular a precisely defined quantity of the test liquid. This quantity can be, for example, between two and twenty liters, for example precisely ten liters. At any rate, the predefined quantity should be known precisely and complied with.

The signal determined in step c) is the signal which the sensor outputs when the quantity of liquid was filled into the tank. This signal can be, for example, an electronic signal which is output by the sensor. The signal can be an electrical pulse sequence or an individual electrical current pulse which is representative of a specific parameter of the liquid additive in the tank. It is also possible for the electrical signal to be more complex. For example, the signal can be an echo, converted into electrical current, of an optical and/or acoustic sensor.

The calibration of the sensor in step d) is preferably carried out in control electronics. These control electronics may be part of a control device of a motor vehicle. It is also possible for these control electronics to be contained in the feed module. The calibration of the sensor is explained below by way of example for a filling level sensor. By means of the calibration step, in particular the signal which is actually generated by the filling level sensor is compared with a reference signal (previously known) which is anticipated as a function of the predefined quantity of the liquid contained in the tank. If there is no correspondence between the reference signal and the signal which is actually generated by the filling level sensor, the signal which is actually generated by the filling level sensor can be adjusted with a correction value by means of the control electronics, with the result that the signal of the filling level sensor corresponds to the reference signal. This correction value which is determined in this way can then always be included for the further operation if the real filling level is determined. Explanations of how the calibration can be carried out are given below for further sensor types.

Furthermore, the method is advantageous if it is carried out during the manufacture of a motor vehicle, after the tank has been installed in the motor vehicle.

The execution of the method after the tank has been installed in the motor vehicle is particularly advantageous if the sensor is a filling level sensor. Under certain circumstances, the tank is deformed by the installation in a motor vehicle. As a result of the calibration of the filling level sensor at a time after which the tank has been installed it is possible also to take into account such deformations during the calibration. The calibration of the filling level sensor therefore becomes particularly precise. The method can be carried out, for example, when the motor vehicle is assembled on a production line. It is also possible for the method to be carried out when the motor vehicle has (just) left a production line. The method can then be carried out, for example, within the scope of initial calibration of the motor vehicle. It is possible, for example, for the method to be carried out when the tank for the liquid additive is first filled. During the first filling, the quantity of liquid additive which is filled into the tank is known precisely. The information about this quantity can then be used to calibrate the filling level sensor.

The method step a) does not have to be carried out in the direct chronological proximity of the execution of the steps b), c) and d). It is also possible for the sensor to be installed in the tank (step a)) for a long time before the execution of steps b), c) and d), for example during pre-assembly of the tank, while the steps b), c) and d) are only carried out later, for example after the termination of the assembly of a motor vehicle in which the tank is installed.

Furthermore, the method is advantageous if the test liquid is water. If the tank is emptied once more after the calibration in order subsequently to fill liquid additive (such as urea-water solution) into the tank, it is appropriate to use water for the calibration. On the one hand, water has a less corrosive effect than the liquid additive described. Water can therefore avoid damage to further components of the motor vehicle. Furthermore, water is economical and has no adverse effects on health. The tank can be emptied after the calibration without the test liquid having to be recovered.

Furthermore, the method is advantageous if the sensor comprises an ultrasonic sensor.

An ultrasonic sensor is suitable, in particular, as a filling level sensor. According to one preferred design, an ultrasonic sensor has an ultrasonic transmitter and an ultrasonic receiver. The ultrasonic transmitter transmits an ultrasonic signal which is reflected and arrives back at the ultrasonic receiver. The ultrasonic signal is preferably reflected at a surface of the liquid in the tank. It is therefore possible for the transit time of the ultrasonic signal to be measured for the distance from the ultrasonic sensor to the surface of the liquid and for this measurement to be used to calculate the specified distance and therefore also the filling level. If appropriate, reflectors or deflection surfaces, which set the desired beam profile, can also be provided.

Furthermore, the method is advantageous if the tank has at least one reference surface which is arranged in such a way that a first measuring section is located between the ultrasonic sensor and the at least one reference surface in the bottom region of the tank, with the result that even in the case of low filling levels in the tank the transit time of an ultrasonic signal through the first measuring section, from the ultrasonic sensor to the reference surface and back, can be measured.

This first measuring section is preferably a portion of a second measuring section from the ultrasonic sensor to the surface of the liquid. The measurement of the transit time to the reference surface can then be carried out together with the measurement of the transit time for determining the filling level.

The ultrasonic sensor can be arranged horizontally. There is then preferably at least one deflection surface along the second measuring section, which deflects the ultrasonic signals in a vertical direction to the surface of the liquid in the tank. The ultrasonic sensor can also be arranged vertically. There are then preferably two deflection surfaces along the second measuring section so that the ultrasonic signal is firstly oriented in a horizontal direction and subsequently again in a vertical direction towards the surface of the liquid.

The reference surface and the first measuring section are preferably arranged in the bottom region of the tank. The bottom region of the tank is characterised in that it is at only a limited distance from the bottom of the tank. This permits the first measuring section to be completely covered by liquid even when there is a small quantity of liquid in the tank. The distance from the bottom of the tank which defines the bottom region is, for example, less than 10 cm [centimeters], particularly preferably less than 5 cm and quite particularly preferably less than 2 cm. This reference surface and the first measuring section can be arranged, for example, in a sump or surge pot of the tank.

It is particularly preferred that two reference surfaces are provided. A transit time difference of the ultrasonic signal with respect to the two different reference surfaces can then be determined. This permits a reference measurement to be carried out which is independent of local particularities in the immediate surroundings of the ultrasonic sensor. It is therefore possible, for example, to compensate manufacturing tolerances of the ultrasonic sensor and/or of a housing of the ultrasonic sensor through which the ultrasonic signal passes.

Furthermore, the method is advantageous if the tank was fabricated using an injection moulding method.

Tanks which are fabricated using an injection moulding method are made, for example, from plastic and are relatively flexible. For this reason, in such tanks a significant deformation of the tank particularly frequently occurs when it is installed in a motor vehicle. For this reason, the method is particularly advantageous in particular in filling level sensors in such tanks.

According to a further embodiment variant, the method is carried out in a plurality of steps. This method variant is advantageous in particular when the sensor is a filling level sensor. In particular the steps b) to d) are regularly repeated here. In each step b) the quantity of test liquid which is filled into the tank is increased by a defined value and a test measurement (step c)) is carried out. It is therefore possible for a characteristic diagram (for example correction value plotted against the filling level) to be produced which precisely maps the relationship between the signal of the filling level sensor and the actual filling level. If only one test value is measured with the method in step c), this test value can be used to adapt, within the scope of step d), constants of a formula which represent a relationship between the signal of the filling level sensor and the filling level which is actually present. In the particularly simple case of a linear formula, for example a proportionality constant of the formula can be calculated from the known quantity of test liquid and the filling level signal.

Furthermore, the method can be applied if the at least one sensor is configured to determine at least one of the following properties of the liquid additive:
  a concentration of at least one component in the liquid additive,
  at least one chemical property of the liquid additive, and
  at least one physical property of the liquid additive.

The component in the liquid additive whose concentration is measured may be, for example, urea. For example, with the sensor it is possible to monitor whether and/or to what degree the urea content in the solution deviates from 32.5 percent by weight. A further component whose concentration can be measured is, for example, ammonia which is dissolved in the liquid additive.

A chemical property of the liquid additive which can be measured with the sensor is, for example, the chemical composition of the liquid additive, the corrosive effect of the liquid additive and/or the reactivity of the liquid additive with other materials. A physical property of the liquid additive which can be measured with the sensor is, for example, the density, the electrical conductivity, the thermal conductivity and/or the viscosity. The enumerations of the chemical and physical properties are each only exemplary here. Depending on the configuration of the sensor, further chemical or physical properties of the liquid additive which are appropriate for a person skilled in the art and/or can be satisfactorily monitored by such a person can also be determined.

The sensor for determining the described properties of the liquid can be, in particular, at the same time a filling level sensor. The ultrasonic sensor described further above is capable, for example, of measuring a speed of an ultrasonic signal in the liquid additive using a reference reflection surface. This speed can be used to calculate the specified properties because a (known) dependence is present between the speed and the respective property of the liquid additive, wherein, if appropriate, cross-influences are taken into account. These cross-influences are, in particular, properties of the liquid additive other than the respective property to be calculated.

The at least one sensor can also comprise any desired other sensors. For example, various sensor types which can be used are enumerated here:
  a temperature sensor,
  a sensor for determining electrical conductivity of the liquid additive,
  a pressure sensor,
  a chemical sensor for detecting a chemical compound, and
  an optical sensor.

In particular, if the at least one sensor comprises a plurality of sensor types, properties of the liquid additive can be determined from the signals of the individual sensors using characteristic diagrams. If precisely one (single) sensor is used to determine precisely one (single) property, such a characteristic diagram is often not necessary. However, under certain circumstances a (mathematical) formula with certain constants is then necessary, with which formula the property of the liquid additive can be calculated from the signal of the sensor. Characteristic diagrams, formulas and constants can be adapted in the calibration step d) of the method.

Furthermore, a tank for storing liquid additive is proposed, comprising a sensor, wherein the tank was manufactured using a method as described.

The particular advantages and refinement features which are described for the method can be applied and transferred analogously to the tank.

Also, a motor vehicle comprising at least an internal combustion engine, an exhaust gas treatment device for purifying the exhaust gases of the internal combustion engines, a tank as described with a sensor and a feed module for supplying liquid additive from the tank to the exhaust gas treatment device is proposed here. Arranged in the exhaust gas treatment device is preferably an SCR catalytic converter at which nitrogen oxide compounds in the exhaust gas of the internal combustion engine can be reduced using the liquid additive. The sensor can be arranged on a feed module which is arranged in or on a tank.

BRIEF DESCRIPTION OF THE SEVERAL VIEWS OF THE DRAWING

The invention and the technical field are explained in more detail below with reference to the figures. The figures show preferred exemplary embodiments, to which the invention is however not limited. In particular it is to be noted that the figures and especially the size ratios illustrated in the figures are only schematic. In the drawing.

DESCRIPTION OF THE INVENTION

Figure 1:
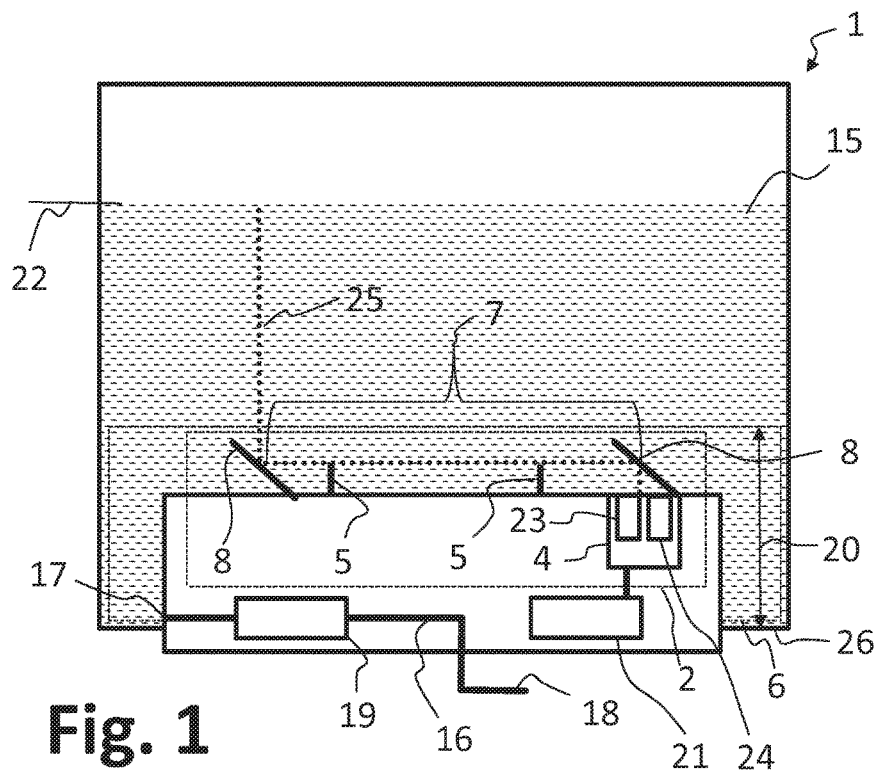
FIG. 1: shows a tank as described with a sensor.

FIG. 1 shows the tank 1, wherein a feed module 11 is inserted in the bottom region 6. The feed module 11 has an intake point 17 at which liquid additive 15 can be extracted from the tank 1. The liquid additive 15 is fed with a pump 19 from the intake point 17 to a supply port 18 along a feed duct 16.

A sensor 2, which comprises an ultrasonic sensor 4, is also arranged on the feed module 11. According to FIG. 1, the sensor 2 is a filling level sensor. The feed module 11 also has two reference surfaces 5. The ultrasonic sensor 4 comprises a transmitter 23 for emitting ultrasonic signals and a receiver 24 for receiving an echo of these emitted ultrasonic signals. Starting from the ultrasonic sensor 4, a second measuring section 25 extends to a liquid surface 22 of the liquid additive 15 in the tank 1. A section of the second measuring section 25 forms a first measuring section 7 in which the reference surfaces 5 are arranged. Furthermore, the feed module 11 has two deflection surfaces 8 which thereby deflect ultrasonic signals from the ultrasonic sensor 4 along the second measuring section 25 or along the first measuring section 7. The deflection surfaces 8 make it possible for the first measuring section 7 to be arranged horizontally and to be located completely in a bottom region 6 of the tank 1. The bottom region 6 of the tank 1 is defined by a maximum distance 20 from the tank bottom 26. This distance 20 is preferably less than 10 cm from the tank bottom 26. The distance 20 is preferably measured here from the lowest point of the tank 1. The feed module 11 preferably also comprises control electronics 21 which are connected to the sensor 2 and which can also include routines (data processing methods) for carrying out the described method.

Figure 2:
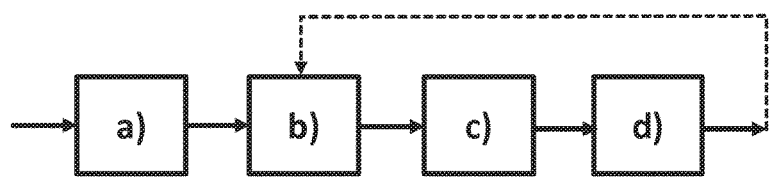
FIG. 2: shows a flowchart of the described method.

FIG. 2 shows for example a flowchart of the described method, comprising the method steps a), b), c) and d). It is apparent that these method steps are carried out one after the other. The method steps b), c) and d) can, if appropriate, be carried out repeatedly within the scope of the method in order to generate a characteristic diagram of the sensor.

Figure 3:
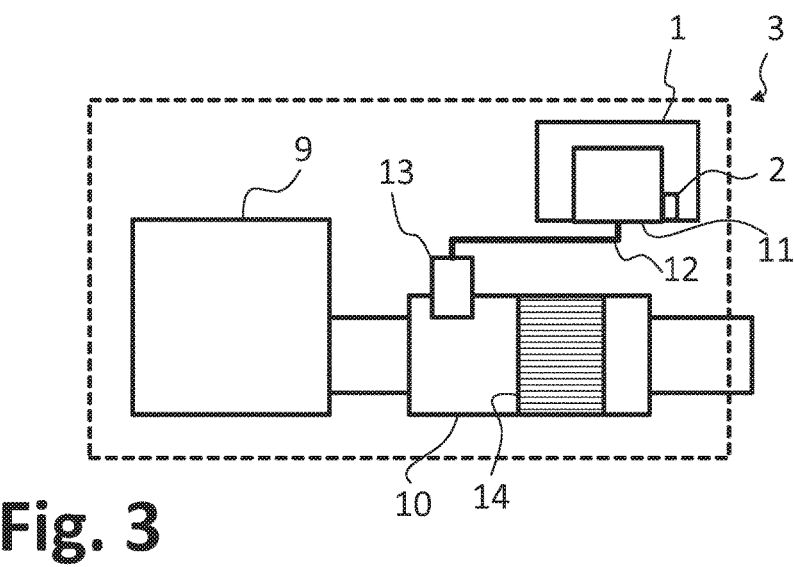
FIG. 3: shows a motor vehicle having a tank as described with a sensor.

FIG. 3 shows a motor vehicle 3, having an internal combustion engine 9 and an exhaust gas treatment device 10 for purifying the exhaust gases of the internal combustion engine 9. An SCR catalytic converter 14 for carrying out the method of selective catalytic reduction is provided in the exhaust gas treatment device 10. A liquid additive (urea-water solution) for purifying exhaust gas can be fed into the exhaust gas treatment device 10 using a delivery device 13. The delivery device 13 is supplied with liquid additive from a tank 1 via a line 12. A feed module 11 is used for this purpose. A sensor 2 is also provided on the tank 1.

By way of precaution it is also to be noted that the combinations of technical features which are shown in the figures are not generally compulsory. It is therefore possible for technical features of one figure to be combined with different technical features of a further figure and/or of the general description. It is otherwise only if the combination of features has been explicitly pointed out here and/or a person skilled in the art knows that otherwise the basic functions of the device or of the method can no longer be implemented.

LIST OF REFERENCE NUMERALS

1 Tank
2 Sensor
3 Motor vehicle
4 Ultrasonic sensor
5 Reference surface
6 Bottom region
7 First measuring section
8 Deflection surface
9 Internal combustion engine
10 Exhaust gas treatment device
11 Feed module
12 Line
13 Delivery device
14 SCR catalytic converter
15 Liquid additive
16 Feed duct
17 Intake point
18 Supply port
19 Pump
20 Distance
21 Control electronics
22 Liquid surface
23 Transmitter
24 Receiver
25 Second measuring section
26 Tank bottom

The invention claimed is:

1. A method for manufacturing a tank for a motor vehicle for storing a liquid additive, the method comprising:
   installing at least one filling level sensor for determining a filling level of the liquid additive in the tank;
   at least partially filling the tank with a predefined quantity of a test liquid;
   determining a signal of the sensor indicating the filling level of the test liquid in the tank;
   calibrating the sensor using a correction value obtained by comparing a reference signal with the signal of the sensor indicating the filling level of the test liquid in the tank;
   emptying the test liquid from the tank after performing the step of calibrating the sensor; and
   adding the liquid additive to the tank after performing the step of emptying the tank;
   wherein the test liquid is water and is not a urea-water solution, and the liquid additive is the urea-water solution; and
   wherein the sensor comprises an ultrasonic sensor.

2. The method according to claim 1, which comprises carrying out all of the steps of claim 1 during a manufacture of the motor vehicle, after the tank has been installed in the motor vehicle.

3. The method according to claim 1, wherein the tank is formed with at least one reference surface arranged in such a way that a measuring section is located between the ultrasonic sensor and the at least one reference surface in a bottom region of the tank, so as to enable, even in the case of low filling levels in the tank, a measurement of a transit time of an ultrasonic signal through the measuring section, from the ultrasonic sensor to the reference surface and back.

4. The method according to claim 1, wherein the tank is a tank fabricated by an injection molding method.

5. The method according to claim 1, wherein the at least one sensor is configured to determine at least one of the following properties of the liquid additive:
   a concentration of a component in the liquid additive;
   a chemical property of the liquid additive; and
   a physical property of the liquid additive.

6. The method according to claim 1, wherein the ultrasonic sensor is configured for emitting an ultrasonic signal, and the step of determining includes using at least one deflector to horizontally deflect the ultrasonic signal of the ultrasonic sensor.

* * * * *